March 14, 1967   E. KLEIN   3,308,702
SHEARS WITH A STATIONARY BLADE AND A MOVABLE BLADE
Filed April 8, 1964   4 Sheets-Sheet 1
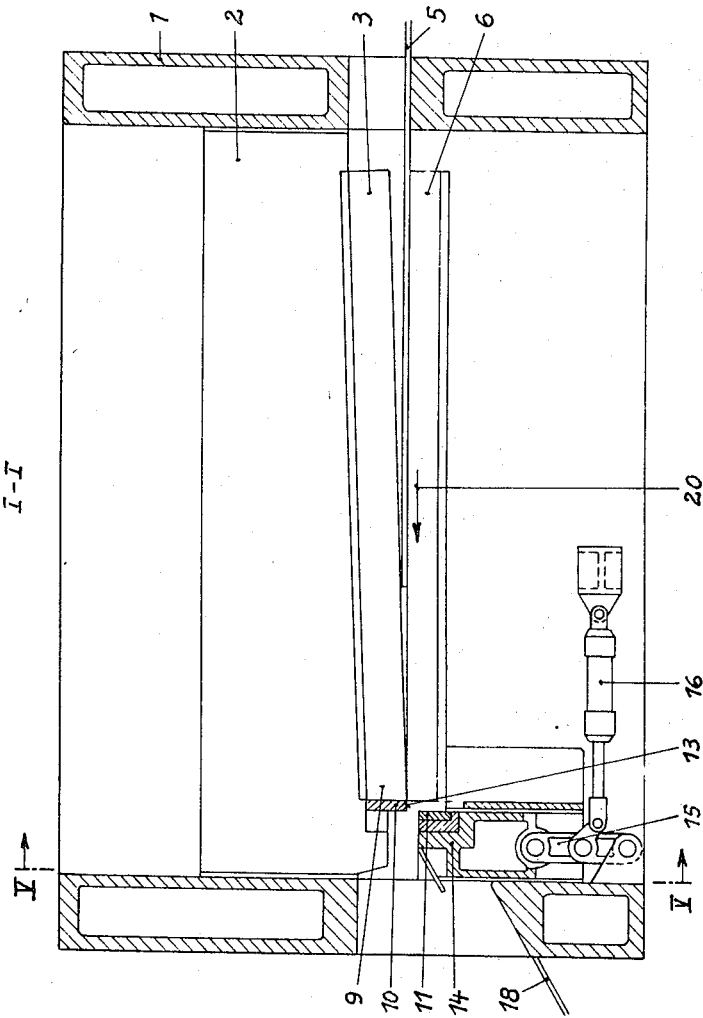

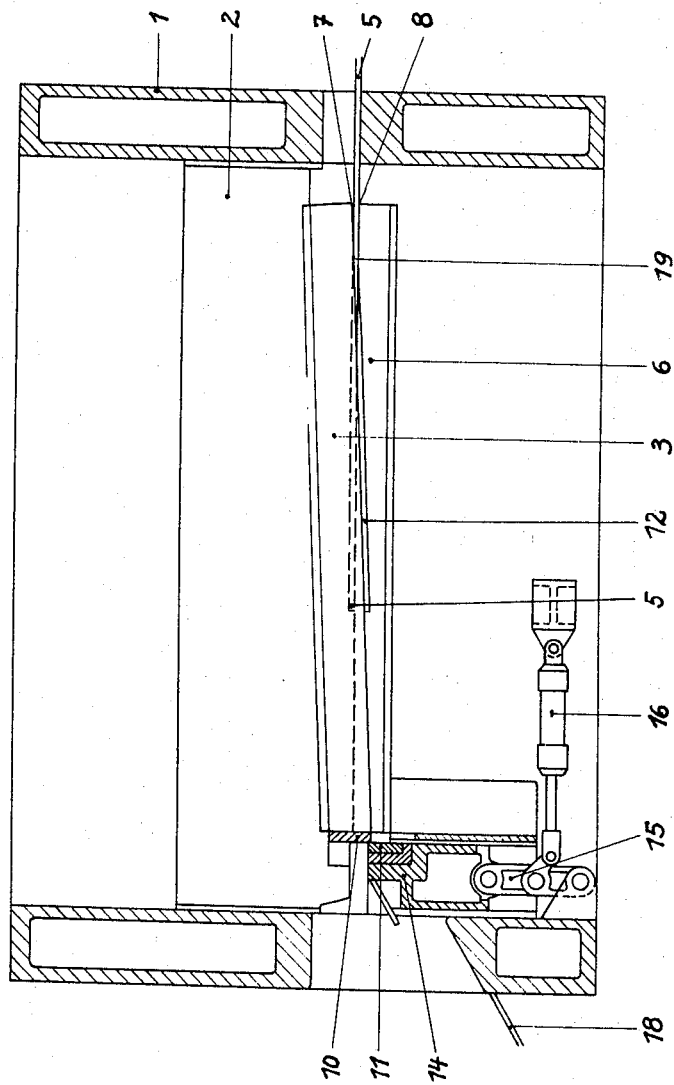

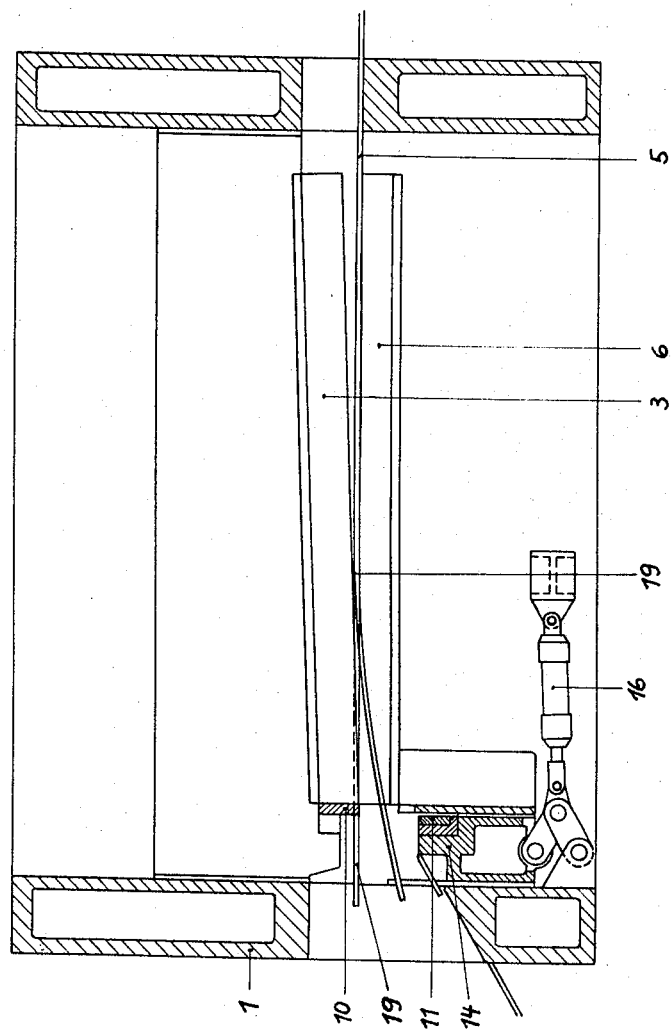

March 14, 1967  E. KLEIN  3,308,702
SHEARS WITH A STATIONARY BLADE AND A MOVABLE BLADE
Filed April 8, 1964  4 Sheets-Sheet 4
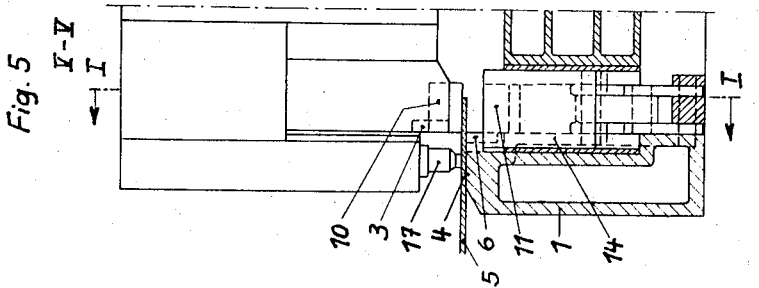
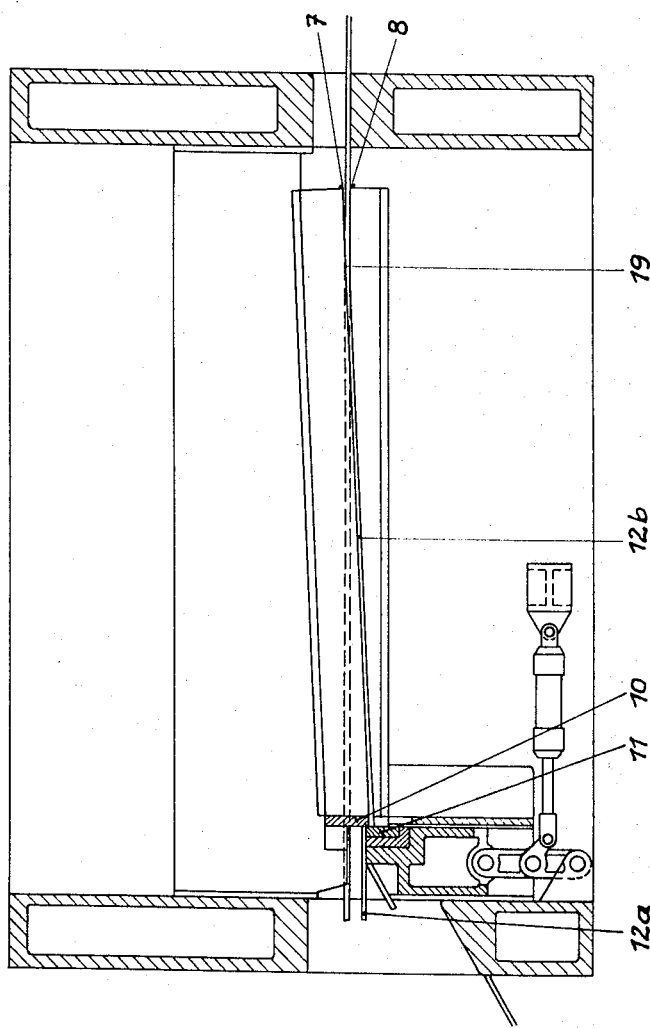

United States Patent Office 3,308,702
Patented Mar. 14, 1967

3,308,702
SHEARS WITH A STATIONARY BLADE AND A MOVABLE BLADE
Ernst Klein, Dusseldorf, Germany, assignor to Schloemann Aktiengesellschaft, Dusseldorf, Germany
Filed Apr. 8, 1964, Ser. No. 358,187
Claims priority, application Germany, Apr. 13, 1963, Sch 33,106
4 Claims. (Cl. 83—558)

This invention relates to shears with a stationary blade and a movable blade, particularly for trimming the edges of rolled metal plates or sheets. In a known manner these blades are combined, on the entry or feed side of the plate, with transverse blades, arranged transversely to the direction of cutting, which cut off the edge that remains hanging on to the plate. The edge of the plate, which here extends transversely to the direction of cutting of the plate, serves during the further advance of the plate as an abutment edge of a stop arranged on the delivery side of the blade. During the succeeding cut there occur undesirable irregularities at the position of this previous plate edge. The greater these irregularities are, the more inaccurately the plate is guided along on the shears. The object of this invention is to obviate these cutting irregularities which are unavoidable with known shears.

According to the invention this object is attained by the fact that the movable blade, which is arranged at an acute angle to the surface that supports the plate, extends in an open position on the delivery side of the plate, right to the stationary blade, the angle of inclination, and the working stroke, being so dimensioned, that in conjunction with the working stroke, in the cutting position, the end of the blade on the entry or feeding side, after the termination of the cut, is located at a distance from the stationary blade equal to the thickness of the plate, and that furthermore the transverse blades, which are provided for the purpose of cutting through the edge strip are arranged on the delivery side of the longitudinal blades.

Owing to the arrangement, according to the invention, of the longitudinal and transverse blades, a cut edge is obtained which serves as a guiding surface for the succeeding cut, and ensures a clean and uninterrupted cut, since the edge strip is not severed from the plate by the transverse blades in the region of this cut edge. Moreover by the special arrangement of the longitudinal blade, the working stroke of the movable blade is diminished by an amount equal to the thickness of the plate, as compared with conventional shears, and accordingly the power required by the shears is also reduced.

In a further development of the invention the co-operating blade corresponding to the movable transverse blade is so arranged at a variable distance from the surface supporting the plate that it can be withdrawn out of reach of the border strip, which becomes bent down during the cutting. By this means, without supplementary bending devices for the edge strip, further advance of the plate is rendered possible in a simple manner. The spacing movement of the transverse blade may advantageously be effected by means of toggle levers, which can be actuated by a power piston, and which move the transverse blade out of reach of the edge strip before the further advance of the plate, and brings it back into the cutting position and arrests it there before the succeeding cut.

In a further development of the invention the movable transverse blade is attached directly to the delivery end of the movable longitudinal blade, its cutting edge being located at the same level as the cutting edge of the longitudinal blade, whereas the cutting edge of the blade cooperating with the movable transverse blade is arranged in staggered relationship to the cutting edge of the stationary longitudinal blade, being displaced therefrom by an amount about equal to the working stroke of the movable blade. This has the advantage that during the cutting the edge strip bent down by the preceding cut can be severed without preparatory deformation.

Shears according to the invention are illustrated in four different operative positions in the drawing, in which:

FIGURE 1 shows the shears with the upper longitudinal and transverse blades raised and with the lower transverse blade raised, FIGURE 2 shows the shears with the upper longitudinal and transverse blades lowered and with the lower transverse blade raised, FIGURE 3 shows the shears with the upper longitudinal and transverse blades raised and with the lower transverse blade lowered, FIGURE 4 shows the shears in the same operative position as in FIGURE 1, but with a different position of the plate to be cut; and FIGURE 5 shows a section along V—V in FIGURE 1.

In the frame 1 of the shears is guided the blade-holder 2, which is movable up and down by a drive, not shown. The upper blade 3, secured to the blade-holder 2, is inclined at an acute angle to the supporting surface 4 for the plate 5. The upper edge of the stationary lower blade 6 is located on a level with the supporting surface 4.

With the upper longitudinal and transverse blades (FIGURE 2) lowered, the upper blade 3, at the entry end 7, is located at a distance from the cutting edge 8 of the stationary lower blade 6 by the amount of the thickness of the plate 5 to be cut. In the open position of the shears (FIGURE 1) the delivery end 9 of the blade 3 extends down to beyond about the cutting edge of the stationary lower blade. Consequently the plate 5 to be cut cannot be pushed (FIGURE 1) right through the open shears. To the delivery end 9 of the upper blade 3 is secured the upper transverse blade 10, so that it always moves up and down along with the upper longitudinal blade 3. The lower transverse blade 11, however, is movable up and down independently of the stationary lower longitudinal blade 6. It is secured to a blade-holder 14, which can be lowered (FIGURE 3) and raised again (FIGURE 4) by means of toggle levers 15. The driving is effected by means of a driving piston located in a power cylinder 16. The upper edge of the lower transverse blade 11 is located, in its upper position, lower down than the upper edge of the lower longitudinal blade 6. The shears operate in the following manner:

The plate to be trimmed is pushed in from the right (FIGURE 1) between the blades 3 and 6 until it strikes with its front edge against the upper blade 3. Next the plate is pressed firmly on to the supporting surface 4 by holding-down devices 17 (FIGURE 5), and the upper blade 3 is pressed down by actuating the driving device, not shown, so that the edge strip 12 is severed (FIGURE 2) from the sound plate. After releasing the holding-down devices 17 and lowering the lower transverse blade 11 by actuating the toggle levers 15, the plate is displaced in the delivery direction (towards the left, compare arrow 20 in FIGURE 1), until it bears (FIGURE 3) with the rear right-hand end of the cut edge 19 on the forward region of the upper blade. After the holding-down devices 17 have now pressed the plate on to the frame 1 again, and the lower transverse blade 14 has been displaced upwards again by actuating the toggle levers 15, the next cut (FIGURE 4) is effected. Herein, by the transverse blades 9 and 11, the edge strip 12a severed by the preceding cut is cut away, and delivered by way of a chute 18 to a scrap-cutter. By lowering the lower transverse blade 11 again after each cut, the further advance of the plate 5 for the succeeding cut is effected without hindrance, since the edge strip 12b, remaining on the plate and bent downwards by the cutting, can be carried away over the lowered lower transverse blade 11 without having to be deformed rearwards again by a supplementary bending device. Since, in addition to this, the lower transverse blade 11 in the cutting position is located lower down than the lower longitudinal blade 6 by an amount about equal to the working stroke of the upper blade, the edge strip 12a is cut off by the transverse blades without back-deformation. The use of the toggle levers as a shifting element for the lower transverse blade has the advantage that the lower transverse blade 11 is rigidly held in the cutting position.

As a modification of the constructional example, the upper longitudinal blade may be stationarily arranged, and the lower longitudinal blade, together with the lower transverse blade, may be movable, the upper transverse blade then being adjustable in height in the same manner as the lower transverse blade 11 of the constructional example.

I claim:

1. Shears for trimming rolled metal sheets or plates, comprising: a stationary longitudinal blade, a movable longitudinal blade co-operating with the said stationary blade, a pair of transverse blades located at the delivery end of the longitudinal blades for cutting up a border strip severed by the longitudinal blades, and a bearing surface for supporting the metal sheet or plate that is being trimmed, one of the transverse blades extending outwardly of the said bearing surface and being driven, for cutting up the severed border strip, in unison with the movable longitudinal blade, and the other transverse blade being movable into its cutting position for cutting up the severed border strip and out of its cutting position to facilitate the advance of the partially severed border strip along with the sheet that is being trimmed, the cutting edge of the movable longitudinal blade being arranged at an acute angle with the said bearing surface, and being still in contact with the stationary longitudinal blade even in the open position of the shears, and the angle of inclination and the working stroke of the movable longitudinal blade being so dimensioned that on the entry side of the shears, at the termination of a cut, the end of the movable longitudinal blade is located at a distance from the stationary longitudinal blade equal to the thickness of the sheet to be cut.

2. Shears as claimed in claim 1, further comprising: means for shifting the movable transverse blade into its cutting position and for retracting the same transverse blade out of the plane of the severed border strip.

3. Shears as claimed in claim 2, the means for shifting and retracting one of movable blade comprising toggle levers, and a power cylinder for actuating the toggle levers.

4. Shears as claimed in claim 3, the transverse blade that co-operates with the blade actuated by the toggle levers being secured to the delivery end of the movable longitudinal blade, and having its cutting edge on a level with that of the movable longitudinal blade, whereas the cutting edge of the transverse blade actuated by the toggle lever, even in its advanced operative position, is behind the cutting edge of the stationary longitudinal blade by an amount about equal to the stroke of the movable longitudinal blade.

References Cited by the Examiner
UNITED STATES PATENTS
1,519,983   12/1924   Robbins _____ 83—622

FOREIGN PATENTS
13,767   6/1904   Norway.

ANDREW R. JUHASZ, *Primary Examiner.*